(12) United States Patent
Kayashima et al.

(10) Patent No.: US 11,090,764 B2
(45) Date of Patent: Aug. 17, 2021

(54) ADDITIVE MANUFACTURING APPARATUS, ADDITIVE MANUFACTURING SYSTEM, AND ADDITIVE MANUFACTURING METHOD

(71) Applicant: Mitsubishi Electric Corporation, Tokyo (JP)

(72) Inventors: Shun Kayashima, Tokyo (JP); Nobuyuki Sumi, Tokyo (JP); Kenji Iriguchi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/317,100

(22) PCT Filed: Apr. 12, 2018

(86) PCT No.: PCT/JP2018/015442
§ 371 (c)(1),
(2) Date: Jan. 11, 2019

(87) PCT Pub. No.: WO2019/198212
PCT Pub. Date: Oct. 17, 2019

(65) Prior Publication Data
US 2019/0351509 A1  Nov. 21, 2019

(51) Int. Cl.
*B23K 26/342* (2014.01)
*B23K 15/00* (2006.01)
(Continued)

(52) U.S. Cl.
CPC ........ *B23K 26/342* (2015.10); *B23K 15/0086* (2013.01); *B33Y 10/00* (2014.12);
(Continued)

(58) Field of Classification Search
CPC .............................. B23K 26/342; B23K 15/00
(Continued)

(56) References Cited

U.S. PATENT DOCUMENTS 3,443,732 A * 5/1969 Wall, Jr. ................... B23K 9/12
228/7
6,143,378 A * 11/2000 Harwell ................ B33Y 10/00
427/597
(Continued)

FOREIGN PATENT DOCUMENTS

CN   102834212 A   12/2012
JP   61-226192 A   10/1986
(Continued)

OTHER PUBLICATIONS

International Search Report dated May 29, 2018 for PCT/JP2018/015442 filed on Apr. 12, 2018, 6 pages including English translation.

(Continued)

*Primary Examiner* — Dana Ross
*Assistant Examiner* — Kuangyue Chen
(74) *Attorney, Agent, or Firm* — Xsensus LLP (57) ABSTRACT

An additive manufacturing apparatus performs additive machining by controlling a machining head that includes a wire nozzle to feed a wire to a machining region on a surface of a base material, a beam source capable of emitting a beam to an end of the wire, and a gas nozzle placed such that the beam source is interposed between the gas nozzle and the wire nozzle, the gas nozzle directing a gas toward the machining region, and the additive manufacturing apparatus includes a machining-condition selection unit to obtain an angle that is formed between a direction in which the wire is fed and a travel direction of the machining head, when viewed in a direction in which the beam is emitted, and to (Continued)

select a machining condition for the additive machining on the basis of the angle.

11 Claims, 10 Drawing Sheets

(51) Int. Cl.
  *B33Y 10/00* (2015.01)
  *B33Y 30/00* (2015.01)
  *B33Y 50/02* (2015.01)
  *B33Y 70/00* (2020.01)
(52) U.S. Cl.
  CPC ............... *B33Y 30/00* (2014.12); *B33Y 50/02* (2014.12); *B33Y 70/00* (2014.12)
(58) Field of Classification Search
  USPC ............. 219/121.13, 121.14, 121.63, 121.64
  See application file for complete search history.

(56) References Cited

U.S. PATENT DOCUMENTS

| | | | |
|---|---|---|---|
| 7,647,698 B2* | 1/2010 | Closmann | B22F 3/1055 29/895 |
| 2002/0096500 A1 | 7/2002 | Ono et al. | |
| 2006/0081571 A1* | 4/2006 | Hoebel | B23K 26/032 219/121.64 |
| 2016/0318128 A1 | 11/2016 | Dutton | |
| 2017/0066080 A1* | 3/2017 | Zeniya | B23K 26/04 |

FOREIGN PATENT DOCUMENTS

| | | | |
|---|---|---|---|
| JP | 2002-283078 A | | 10/2002 |
| JP | 2004255410 A | * | 9/2004 |
| JP | 2011-161452 A | | 8/2011 |
| JP | 2013-146753 A | | 8/2013 |
| JP | 2014-24078 A | | 2/2014 |

OTHER PUBLICATIONS

Office Action dated Jul. 20, 2020 in Chinese Patent Application No. 201880003387.2, 14 pages.
Extended European Search Report dated Mar. 4, 2020 in European Application No. 18833591.3.
Decision of Refusal dated Feb. 4, 2021 from the Chinese patent office in Chinese Application No. 20188003387.2.
Office Action dated Nov. 10, 2020, in corresponding Chinese patent Application No. 201880003387.2, 7 pages.
Communication pursuant to Article 94(3) EPC dated Sep. 23, 2020, in corresponding European patent Application No. 18 833 591.3, 4 pages.

* cited by examiner

----- SYMMETRICAL BEAD SHAPE

| MACHINING CONDITION NUMBER | | 1 | 2 | ... | MAX |
|---|---|---|---|---|---|
| MACHINING HEAD TRAVEL DIRECTION RANGE θ (°) | | 0 TO 10 | 10 TO 20 | ... | PRECEDING SET VALUE TO 360 |
| MACHINING-CONDITION SET VALUE | LASER OUTPUT (kw) | 1.5 | 1.7 | ... | 1.5 |
| | GAS PRESSURE (MPa) | 10 | 15 | ... | 10 |
| | ⋮ | ⋮ | ⋮ | ⋮ | ⋮ |

ADDITIVE MANUFACTURING APPARATUS, ADDITIVE MANUFACTURING SYSTEM, AND ADDITIVE MANUFACTURING METHOD

CROSS-REFERENCE TO RELATED APPLICATIONS

This application is a National Stage Application based on PCT/JP2018/015442, filed on 12 Apr. 2018, the entire contents of which being incorporated herein by reference.

FIELD

The present invention relates to an additive manufacturing apparatus, an additive manufacturing system, and an additive manufacturing method for performing wire-type additive manufacturing machining.

BACKGROUND

It is known that, when wire-type additive manufacturing machining is performed under preset machining conditions, a shape error with respect to an ideal bead shape occurs depending on the angular difference between the feed direction of the wire and the travel direction of the machining head. The machining conditions include beam output, gas pressure, and the like, and the ideal bead shape refers to a bead share having a symmetrical cross-sectional shape and a constant ratio of the bead width to the bead height. Occurrence of a shape error of the bead shape can mean that the bead shape is off-center such that its cross-sectional shape becomes asymmetrical or that the ratio of the bead width to the bead height deviates from a constant value.

The relationship between the machining travel direction and off-centering of the bead shape is described in Patent Literature 1. Patent Literature 1 describes that, when arc welding is performed by moving a welding torch that is tilted toward one of the directions that are orthogonal to the welding travel direction, an off-centered bead is generated due to unevenness in heat input to the base material.

CITATION LIST

Patent Literature

Patent Literature 1: Japanese Patent Application Laid-open No. 2013-146753

SUMMARY

Technical Problem

There is a method for causing the angular difference between the feed direction of the wire and the travel direction of the machining head to be constant all the time and thereby creating an ideal bead shape. In this method, the workpiece itself is rotated. Use of this method, however, causes a problem in that the machining region is reduced due to the need to attach a rotation table to the machining device, a problem in that there is increased complexity because the number of azes of the device is increased, and other problems. There has thus been a desire to avoid off-centering of the bead shape in the wire-type additive manufacturing machining by using simple control.

The present invention has been achieved in view of the above, and an object of the present invention is to provide an additive manufacturing apparatus that can prevent off-centering of the bead shape by using simple control.

Solution to Problem

To solve the problems described above and achieve the object described above, an additive manufacturing apparatus according to an aspect of the present invention performs additive machining by controlling a machining head that includes a wire nozzle to feed a wire-like material to a machining region on a surface of a base material, a beam source capable of emitting a beam to the wire-like material, and a gas nozzle placed such that the beam source is interposed between the gas nozzle and the wire nozzle, the gas nozzle directing a gas toward the machining region. The additive manufacturing apparatus according to an aspect of the present invention includes a machining-condition selection unit to obtain an angle that is formed between a direction in which the wire-like material is fed and a travel direction of the machining head, when viewed in a direction in which the beam is emitted, and to select a machining condition for the additive machining on a basis of the angle.

Advantageous Effects of Invention

An additive manufacturing apparatus according to the present invention produces an effect of enabling prevention of off-centering of the bead shape by using simple control.

BRIEF DESCRIPTION OF DRAWINGS

FIG. 19 is a diagram illustrating a hardware configuration in a case in which a function of each of the numerical control apparatuses according to the first and second embodiments is implemented by a computer system.

DESCRIPTION OF EMBODIMENTS

An additive manufacturing apparatus, an additive manufacturing system, and an additive manufacturing method according to embodiments of the present invention are described below in detail with reference to the drawings. The present invention is not limited to the embodiments.

First Embodiment

Figure 1:
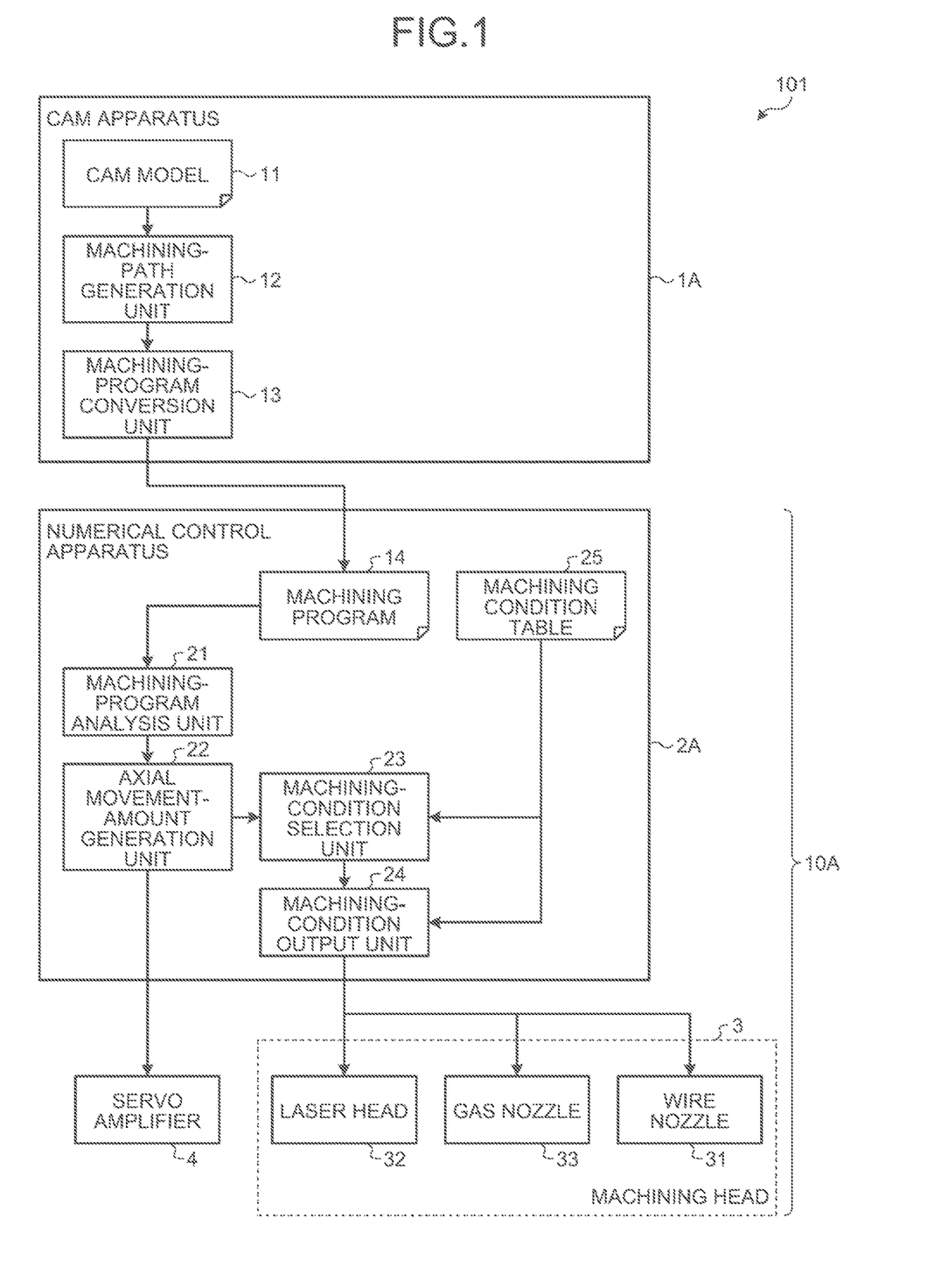
FIG. 1 is a block diagram illustrating a functional configuration of an additive manufacturing system according to a first embodiment of the present invention.

FIG. 1 is a block diagram illustrating a functional configuration of an additive manufacturing system 101 according to a first embodiment of the present invention. The additive manufacturing system 101 includes a computer aided manufacturing (CAM) apparatus 1A and an additive manufacturing apparatus 10A. The additive manufacturing apparatus 10A includes a numerical control apparatus 2A, a machining head 3, a servo amplifier 4, and a motor (not illustrated) that is driven by the servo amplifier 4.

Figure 2:
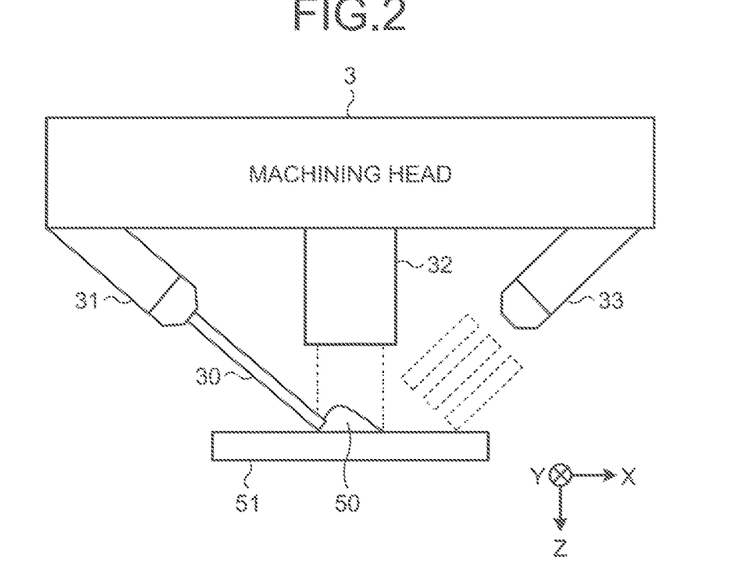
FIG. 2 is a diagram illustrating a configuration of a machining head according to the first embodiment.

FIG. 2 is a diagram illustrating a configuration of the machining head 3 according to the first embodiment. The machining head 3 includes a wire nozzle 31 that feeds a wire 30 that is a wire-like material; a laser head 32 that is a beam source that can emit a laser beam to the end of the wire 30; and a gas nozzle 33 that directs gas toward a machining region on the surface of a base material 51. The wire nozzle 31 feeds the wire 30 onto the base material 51 in a certain direction and at a constant speed. The wire 30 fed by the wire nozzle 31 is heated and melted by the laser beam in the machining region to form a bead 50. That is, the machining region is a region on the surface of the base material 51 in which the bead 50 is formed. The gas nozzle 33 is placed such that the laser head 32 is interposed between the gas nozzle 33 and the wire nozzle 31, and an electro-pneumatic valve controls the ejection of the gas that is used for cooling the bead 50 formed in the machining region. During additive machining, the machining head 3 moves in the travel direction that is the direction perpendicular to the Z direction in FIG. 2 while the laser beam is emitted onto the end of the wire 30, with the Z direction being the emission direction of the laser beam. Consequently, the bead 50 is formed such that it extends in a direction opposite to the travel direction on the surface of the base material 51. In this case, because the laser beam emitted onto the surface of the base material 51 is blocked by the wire 30 itself, the condition of the heat, input to the base material 51 varies as described below in accordance with the relationship between the covered region and the travel direction of the machining head 3. The direction in which the wire nozzle 31 feeds the wire 30 is opposite to the direction in which the gas nozzle 33 emits the gas when viewed in the direction in which the laser head 32 emits the laser beam. In FIG. 2, the direction in which the laser head 32 emits the laser beam is in the Z direction and the directions parallel to the surface of the base material 51 are in the X direction and the Y direction, which are perpendicular to the Z direction. The direction in which the wire nozzle 31 feeds the wire 30 is in the X direction when the direction is projected perpendicularly on the XY plane. Because the laser head 32, which includes a laser oscillator, is used as a beam source, the bean used here is a laser beam; however, the beam source may be changed to an electron beam source and the beam may be an electron beam. That is, there is no limitation to the beam source as long as a beam that can heat and melt the wire 30 is available.

The CAM apparatus 1A includes a computer-aided design (CAD) model 11 that specifies the target shape to be additively manufactured; a machining-path generation unit 12 that analyzes the CAD model 11 and thereby generates a machining path; and a machining-program conversion unit 13 that converts the machining path generated by the machining-path generation unit 12 to a machining program 14. The machining-program conversion unit 13 sends the generated machining program 14 to the numerical control apparatus 2A. The machining program 1A indicates a trajectory of the machining head 3 to thereby specify the machining path.

The numerical control apparatus 2A includes a machining-program analysis unit 21, an axial-movement-amount generation unit 22, a machining-condition selection unit 23, a machining-condition output unit 24, and a machining condition table 25.

The machining-program analysis unit 21 analyzes the machining program 14 and thereby determines the end-point coordinates of each machining path specified by the machining program 14, and sends the end-point coordinates of each machining path to the axial-movement-amount generation unit 22.

The azial-movement-amount generation unit 22 receives the result of analysis performed by the machining-program analysis unit 21. The axial-movement-amount generation unit 22 generates a movement-amount command value for each axial direction per control cycle of the numerical control apparatus 2A on the basis of the end-point coordinates of each machining path. Each axis here corresponds to a drive shaft that is driven by a driving device (not illustrated) that can change the relative positions of the machining head 3 and the base material 51. The axial-movement-amount generation unit 22 sends the generated movement-amount command value for each axial direction to the servo amplifier 4 and the machining-condition selection unit 23.

The machining condition table 25 is a data table for presetting set values of machining conditions according to the travel direction of the machining head 3.

The machining-condition selection unit 23 calculates a travel direction θ of the machining head 3 on the basis of the movement-amount command value for each axial direction received from the axial-movement-amount generation unit 22. The travel direction of the machining head 3 is in a direction perpendicular to the Z direction, which is the emission direction of the laser beam as described above. The travel direction θ of the machining head 3 can thus form an angle of 360° within the XY plane around an axis of the emission direction of the laser beam. Here, the travel direction θ is an angle formed between the travel direction of the machining head 3 and a reference direction when viewed in the emission direction of the laser beam. When the reference direction is in the positive X direction and the travel direction of the machining head 3 is in the positive X direction, θ=0 degrees. The direction indicated by an arrow X in FIG. 2 is defined as the positive X direction, and the positive X direction may be simply referred to as the X direction hereinafter. Thus, the travel direction θ is obtained when θ=tan$^{-1}$ (movement-amount command value in the Y direction/movement-amount command value in the X direction). In FIG. 2, the direction in which the wire 30 is fed by the wire nozzle 31 is in the positive X direction, which is the reference direction, when the direction is projected perpendicularly on the XY plane. Thus, the travel direction θ of the machining head 3 is an angle formed between the direction in which the wire 30 is fed and the travel direction of the machining head 3 when viewed in the direction in which the laser beam is emitted.

The machining-condition selection unit 23 references the machining condition table 25 and selects a machining condition front the machining condition table 25 using the travel direction θ of the machining head 3, which is obtained in the manner described above. The machining-condition selection unit 23 then sends a machining-condition set value that is a set value for the selected machining condition to the machining-condition output unit 24.

The machining-condition output unit 24 outputs the machining-condition set value received from the machining-condition selection unit 23 to the laser head 32 and the gas nozzle 33.

The laser head 32 receives, from the machining-condition output unit 24, a laser output value (kw) as the machining-condition set value and controls the laser oscillator such that the received laser output value is obtained.

The gas nozzle 33 receives, from the machining-condition output unit 24, a gas pressure (MPa) as the machining-condition set value and controls the electro-pneumatic valve such that the received gas pressure is obtained.

On the basis of the movement-amount command value for each axial direction received from the azial-movement-amount generation unit 22, the servo amplifier 4 drives the motor that moves, in each axial direction, a table (not illustrated) on which the base material 51, which is the workpiece, is placed.

The additive manufacturing apparatus 10A according to the first embodiment performs additive machining on the basis of the machining condition table 25, which stores machining conditions in accordance with the travel direction of the machining head 3 as described above; however, a description will be given, using comparative examples, of a case in which additive machining is performed under the same machining condition all the time with no consideration given to the travel direction of the machining head 3.

Figure 3:
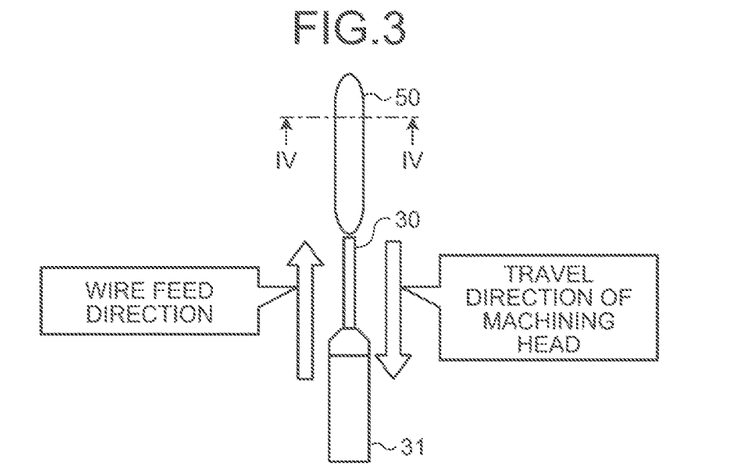
FIG. 3 is a diagram illustrating a first comparative example where the direction in which a wire is fed is opposite to the travel direction of the machining head.
Figure 4:
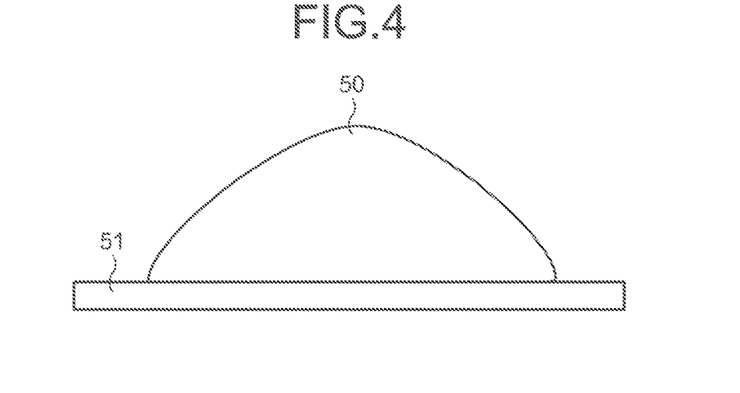
FIG. 4 is a diagram illustrating a cross-sectional shape of a bead taken along line IV-IV in FIG. 3 as viewed in the directions of the arrows.
Figure 5:
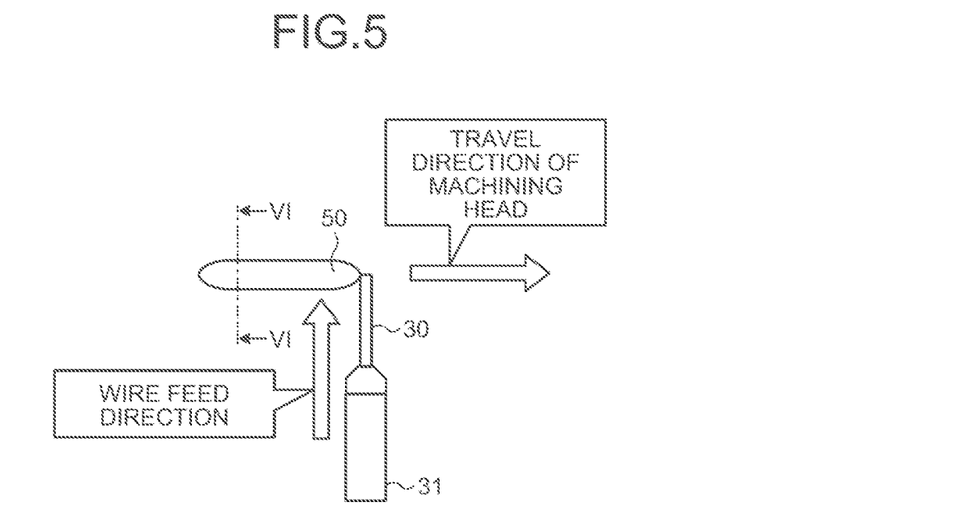
FIG. 5 is a diagram illustrating a second comparative example where the direction in which the wire is fed and the travel direction of the machining head form a right angle.
Figure 6:
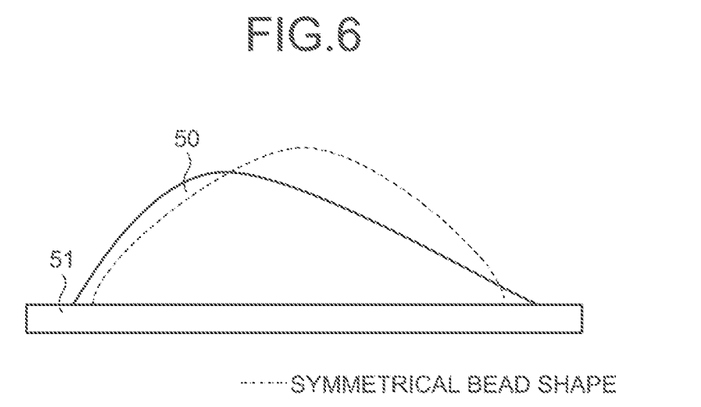
FIG. 6 is a diagram illustrating a cross-sectional shape of the bead taken along line VI-VI in FIG. 5 as viewed in the directions of the arrows.

FIG. 3 is a diagram illustrating a first comparative example where the direction in which the wire 30 is fed is opposite to the travel direction of the machining head 3. FIG. 4 is a diagram illustrating a cross-sectional shape of the bead 50 taken along line IV-IV in FIG. 3 as viewed in the directions of the arrows. FIG. 5 is a diagram illustrating a second comparative example where the direction in which the wire 30 is fed and the travel direction of the machining head 3 form a right angle. FIG. 6 is a diagram illustrating a cross-sectional shape of the bead 50 taken along line VI-VI in FIG. 5 as viewed in the directions of the arrows. FIGS. 3 and 5 are diagrams illustrating the bead 50 as viewed in the emission direction of the laser beam.

As illustrated in FIG. 3, which is a view in the emission direction of the laser beam, which is a direction perpendicular to the drawing plane of FIG. 3, when the direction in which the wire 30 is fed is opposite to the travel direction of the machining head 3, the cross-sectional shape of the bead 50 is bilaterally symmetric as illustrated in FIG. 4. This is because the percentage of the laser beam, emitted by the laser head 32, that is blocked by the wire 30 does not become uneven on the right and left sides of the wire 30 on the drawing plane of FIG. 3. As a result, there is no unevenness in heating of the base material 51 by the laser beam on the right and left sides of the base material 51 in FIG. 4; thus, the cross-sectional shape of the bead 50 becomes bilaterally symmetric. As will be described in detail below, in a case where the direction in which the wire 30 is fed is the same as the travel direction of the machining head 3 when viewed in the emission direction of the laser beam, which is the direction perpendicular to the drawing plane of FIG. 3, the cross-sectional shape of the bead 50 changes but remains bilaterally symmetric.

In contrast, when the direction in which the wire 30 is fed and the travel direction of the machining head 3 form a right angle as illustrated in FIG. 5, the cross-sectional shape of the bead 50 is asymmetrical and off-center as illustrated in FIG. 6. The bead shape that is symmetrical and is not off-center illustrated in FIG. 3 is indicated by a broken line in FIG. 6. The cross-sectional shape of the bead 50 becomes off-centered because the laser beam emitted by the laser head 32 to the base material 51 is blocked by the wire 30 by different percentage on the upper and lower sides of the end of the wire 30 on the drawing plane of FIG. 5. That is, in FIG. 5, the percentage by which the laser beam emitted by the laser head 32 to the base material 51 is blocked by the wire 30 is larger on the lower side of the end of the wire 30 than that on the upper side thereof. As a result, when the machining head 3 travels to the right on the drawing plane of FIG. 5, a portion of the base material 51 that is located on the upper side of the end of the wire 30 is heated more than a portion of the base material 51 that is located, on the lower side thereof. Consequently, on the drawing plane of FIG. 6, the bead 50 has a lower height in a portion on the right side of the base material 51 than on the left side of the base material 51, the right side being heated more than on the left side on which the percentage of the laser beam blocked by the wire 30 is higher, which produces an off-center in the cross-sectional shape of the bead 50.

As described above, in a wire-type welding technology using a beam source as a heat source, the percentage of the amount of beam irradiation of the base material 51 that is blocked by the wire 30 immediately before the additive machining varies depending on the angular difference between the wire feed direction and the travel direction of the machining head 3, which is the welding travel direction. The width and height of the bead 50 formed by the additive machining change depending on the variation of the percentage of the amount of beam irradiation blocked by the wire 30. This is described in greater detail using comparative examples below.

Figure 7:
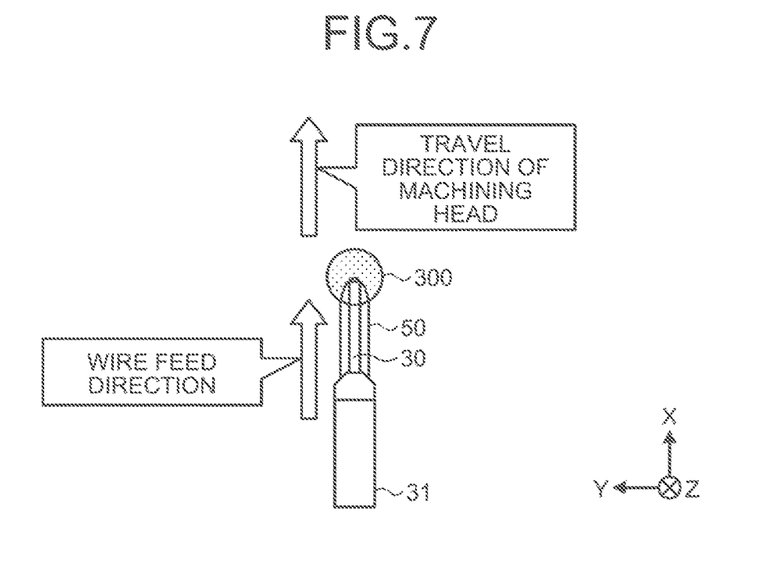
FIG. 7 is a diagram illustrating a third comparative example where the direction in which the wire is fed is the same as the travel direction of the machining head.
Figure 8:
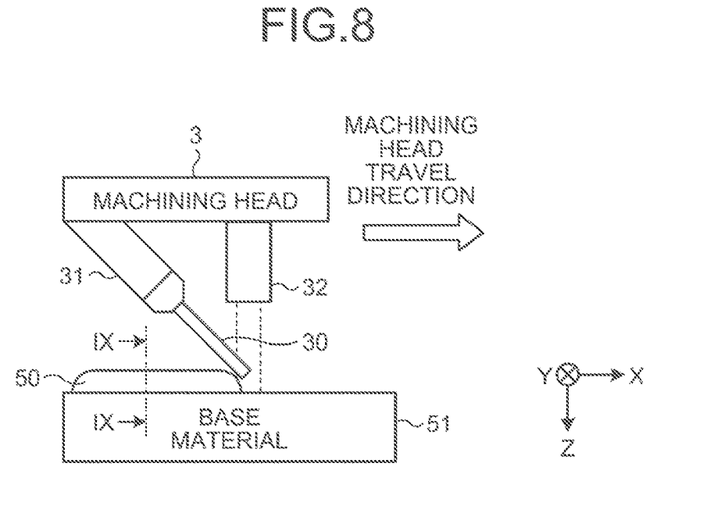
FIG. 8 is a diagram illustrating FIG. 7 as viewed in a Y direction, which is parallel to the surface of a base material.
Figure 9:
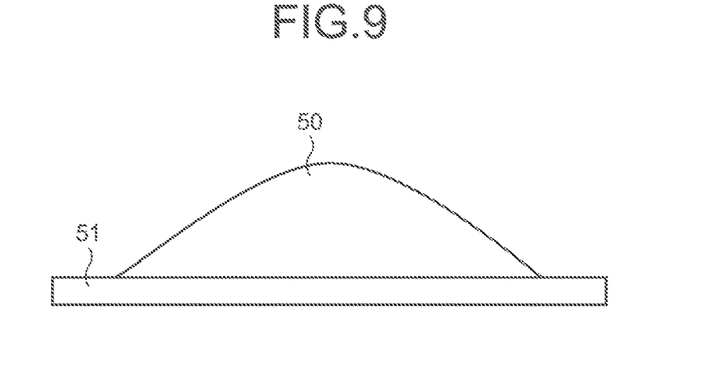
FIG. 9 is a diagram illustrating a cross-sectional shape of the bead taken along line IX-IX in FIG. 9 as viewed in the directions of the arrows.
Figure 10:
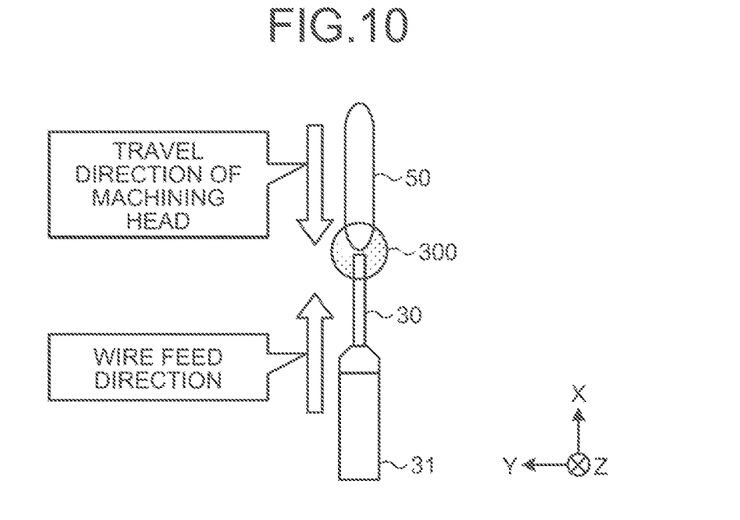
FIG. 10 is a diagram illustrating a fourth comparative example where the direction in which the wire is fed is opposite to the travel direction of the machining head.
Figure 11:
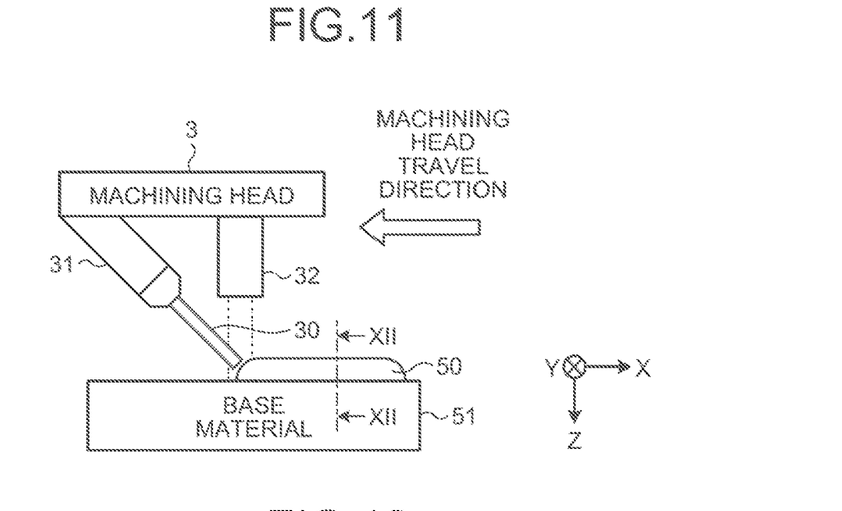
FIG. 11 is a diagram illustrating FIG. 10 as viewed in the Y direction, which is parallel to the surface of the base material.
Figure 12:
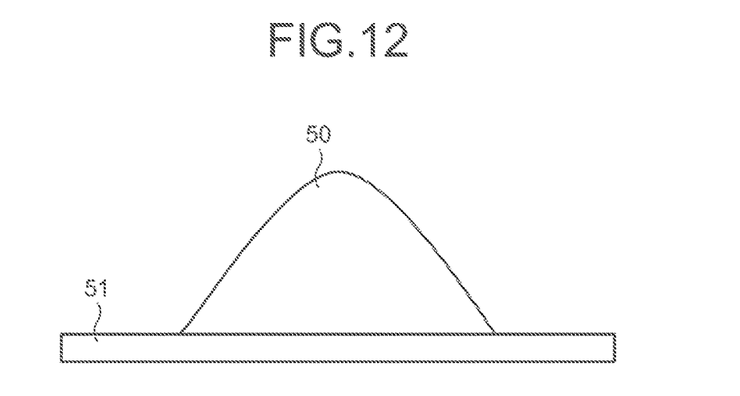
FIG. 12 is a diagram illustrating a cross-sectional shape of the bead taken along line XII-XII in FIG. 11 as viewed in the directions of the arrows.

FIG. 7 is a diagram illustrating a third comparative example where the direction in which the wire 30 is fed is the same as the travel direction of the machining head 3. FIG. 7 is a diagram illustrating the bead 50 as viewed in the Z direction, which is the emission direction of the laser beam. FIG. 8 is a diagram illustrating FIG. 7 as viewed in the Y direction, which is parallel to the surface of the base material 51. FIG. 9 is a diagram illustrating a cross-sectional shape of the bead 50 taken along line IX-IX in FIG. 8 as viewed in the directions of the arrows. FIG. 10 is a diagram illustrating a fourth comparative example where the direction in which the wire 30 is fed is opposite to the travel direction of the machining head 3. FIG. 10 is a diagram illustrating the bead 50 as viewed in the Z direction, which is the emission direction of the laser beam. FIG. 11 is a diagram illustrating FIG. 10 as viewed in the Y direction, which is parallel to the surface of the base material 51. FIG. 12 is a diagram illustrating a cross-sectional shape of the bead 50 taken along line XII-XII in FIG. 11 as viewed in the directions of the arrows.

When the direction in which the wire 30 is fed is the same as the travel direction of the machining head 3 as illustrated in FIG. 7, the percentage or the amount of beam irradiation of the base material 51 that is blocked by the wire 30 immediately before the additive machining in a laser-beam irradiation region 300 is smaller than that in the case of FIG. 10. In the case of FIG. 7, the wire 30 is at a position that overlaps with the bead 50 as viewed in the direction in which the laser beam is emitted; thus, the area of the portion in which the base material 51 is covered by the wire 30 in the laser-beam irradiation region 300 is only the area of the bead 50. The area of a portion in which the base material 51 that is directly irradiated with the laser beam immediately before the additive machining in the laser-beam irradiation region 300 in FIG. 7 is larger than that in the case of FIG. 10. As a result, in FIG. 7, preheating of the base material 51 is greater than that in the case of FIG. 10 and the temperature gradient is moderate during cooling; thus, as illustrated in FIG. 9, the bead width of the bead 50 tends to be wider and the bead height thereof tends to be lower than those in FIG. 12.

When the direction in which the wire 30 is fed is opposite to the travel direction of the machining head 3 as illustrated in FIG. 10, the percentage of the amount of beam irradiation of the base material 51 that is blocked by the wire 30 immediately before the additive machining in the laser-beam irradiation region 300 is larger than that in the case of FIG. 7. In the case of FIG. 10, the area of the portion in which the base material 51 is covered by the wire 30 in the laser-beam irradiation region 300 corresponds to the area of the bead 50 and the area of the wire 30 as viewed in the direction in which the laser beam is emitted. The area of a portion of the base material 51 that is directly irradiated with the laser beam immediately before the additive machining in the laser-beam irradiation region 300 in FIG. 10 is smaller than that in the case of FIG. 7. As a result, in FIG. 10, the preheating of the base material 51 is smaller than that in the case of FIG. 7 and the temperature gradient is steep during the cooling; thus, as illustrated in FIG. 12, the bead width of the bead 50 tends to be narrower and the bead height thereof tends to be higher than those in FIG. 9. As described above, in the cases of FIGS. 7 and 10, the bead shapes are not off-center; however, the bead widths and bead heights are different.

Figure 13:
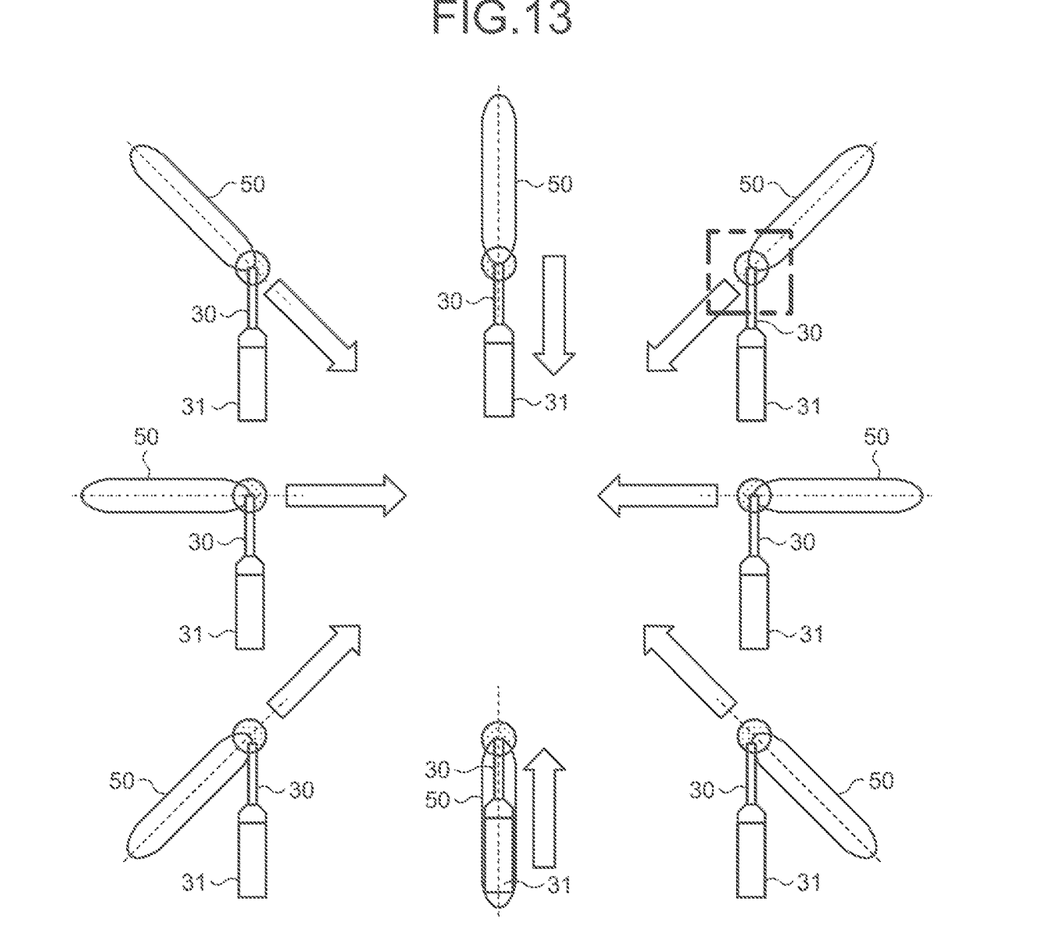
FIG. 13 is a diagram illustrating how the travel direction of the machining head changes with respect to the direction in which the wire is fed in the first embodiment.
Figure 14:
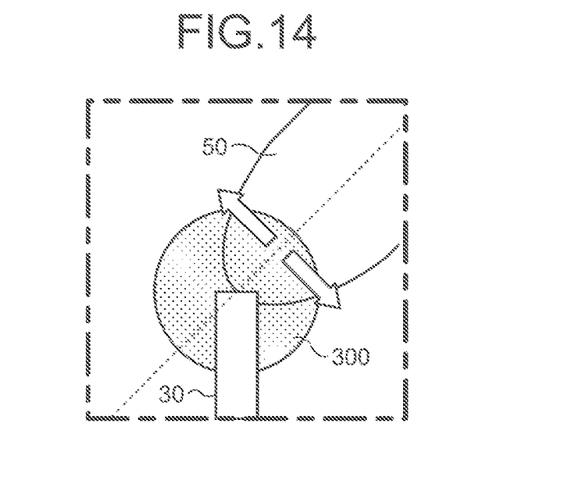
FIG. 14 is an enlarged view of a portion surrounded by an alternate long and short dash line in FIG. 13.

FIG. 13 is a diagram illustrating how the travel direction of the machining head 3 changes with respect to the direction in which the wire 30 is fed in the first embodiment. FIG. 13 includes the cases described in FIGS. 3 to 12. FIG. 14 is an enlarged view of a portion surrounded by an alternate long and short dash line in FIG. 13. In FIG. 14, the travel direction of the machining head 3 is indicated by a broken line. A portion of the laser-beam irradiation region 300 in FIG. 14 located to the lower right of the broken line is covered by the wire 30. Preheating of the base material 51 in the portion of the laser-beam irradiation region 300 located to the lower right of the broken line in FIG. 14 is thus lower than that in the portion of the laser-beam irradiation region 300 located to the upper left of the broken line, and the height of the bead 50 in the portion of the laser-beam irradiation region 300 located to the lower right of the broken line tends to be higher than that in the portion of the laser-beam irradiation region 300 located to the upper left of the broken line. The bead 50 in FIG. 6 is off-center such that it is higher on the left side than on the right side for the same reason.

As described above, the bead width and bead height change as the amount of preheating of the base material 51 changes. Thus, to keep the bead width and bead height constant, it is only necessary to change the laser output depending on the angle formed by the direction in which the wire 30 is fed and the travel direction of the machining head 3 within a plane perpendicular to the direction in which the laser beam is emitted. Specifically, in the case of FIG. 7, the percentage of the amount of beam irradiation of the base material 51 that is blocked by the wire 30 immediately before the additive machining is smaller than that in the case of FIG. 10. Thus, in the case of FIG. 7, it is only necessary to reduce the laser output. When the laser output is not changed in the case of FIG. 7, it is only necessary to increase the laser output in the case of FIG. 10.

Additionally, the bead shape becomes off-center due to unevenness in the amount of preheating of the base material 51, which is dependent on the angle formed by the direction in which the wire 30 is fed and the travel direction of the machining head 3 within the plane perpendicular to the direction in which the laser beam is emitted. Thus, to prevent off-centering of the bead shape, it is only necessary to correct unevenness in the amount of heat input within the laser-beam irradiation region 300. Specifically, the gas pressure of the cooling gas ejected from the gas nozzle 33 or the beam profile of the laser beam may be adjusted depending on the angle described above.

Figure 15:
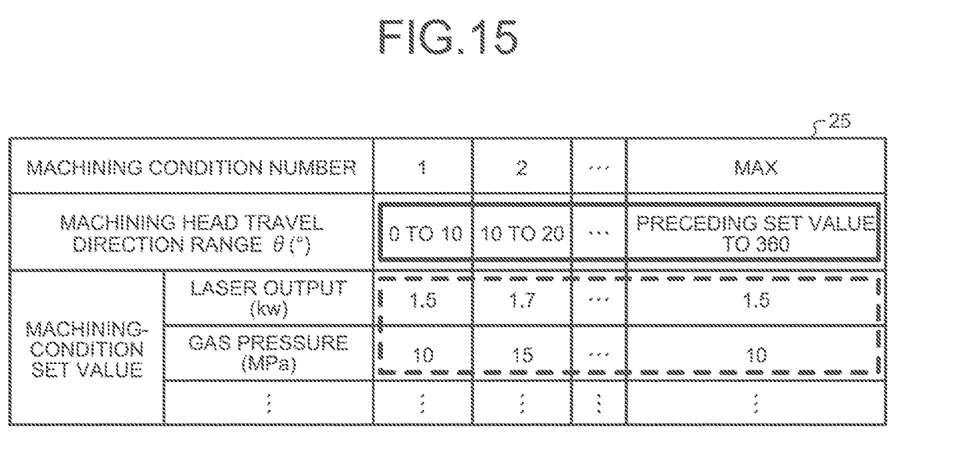
FIG. 15 is a diagram illustrating an example of a machining condition table according to the first embodiment.

FIG. 15 is a diagram illustrating an example of the machining condition table 25 according to the first embodiment. In the machining condition table 25 in FIG. 15, a machining condition number is assigned to each range of the travel direction θ of the machining head 3 within the plane perpendicular to the direction in which the laser beam is emitted. The machining condition number serves as a machining condition index for specifying a machining condition, and the maximum machining condition number MAX can be determined as a parameter by a user. As described above, since the direction in which the wire 30 is fed by the wire nozzle 31 is defined as the positive X direction within the plane perpendicular to the direction in which the laser beam is emitted, the travel direction θ of the machining head 3 is an angle formed by the direction in which the wire 30 is fed and the travel direction of the machining head 3 within the plane perpendicular to the direction in which the laser beam is emitted. The ranges of the travel directions θ of the machining head 3 corresponding to different machining condition numbers do not overlap with each other; thus, a machining-condition set value that corresponds to a given travel direction θ of the machining head 3 is uniquely determined. The laser output value (kw) that is the output of a beam emitted by the bean source and the gas pressure (MPa) of the gas ejected from the gas nozzle 33 are stored as machining-condition set values in FIG. 15. Machining-condition set values that depend on the travel direction θ of the machining head 3 can be obtained by obtaining, in advance by experiment or the like, the correlation between the machining condition and an error between the shape into which the bead is actually formed and the target bead shape, with the correlation being dependent on the travel direction θ of the machining head 3.

Values obtained in this manner are stored as the machining-condition set values in FIG. 15. There is no limitation to the machining condition for which machining-condition set values are stored in the machining condition table 25 as long as it is correlated with the error of the bead shape and can be controlled from the numerical control apparatus 2A.

The machining-condition selection unit 23 obtains the travel direction θ of the machining head 3 on the basis of the movement-amount command value for each axial direction received from the axial-movement-amount generation unit 22, and selects a machining condition number from the machining condition table 25 using the obtained travel direction θ of the machining head 3. The machining-condition selection unit 23 sends machining-condition set values that correspond to the selected machining condition number to the machining-condition output unit 24. The machining-condition output unit 24 outputs, to the laser head 32 and the gas nozzle 33, the machining-condition set values received from the machining-condition selection unit 23.

If the machining-condition output unit 24 can reference the machining condition table 25, the machining-condition selection unit 23 may only select a machining condition number from the machining condition table 25 using the obtained travel direction θ of the machining head 3. In this case, the machining-condition selection unit 23 sends the selected machining condition number to the machining-condition output unit 24. The machining-condition output unit 34 references the machining condition table 25 on the basis of the machining condition number sent from the machining-condition selection unit 23 and outputs corresponding machining-condition set values to the laser head 32 and the gas nozzle 33.

Figure 16:
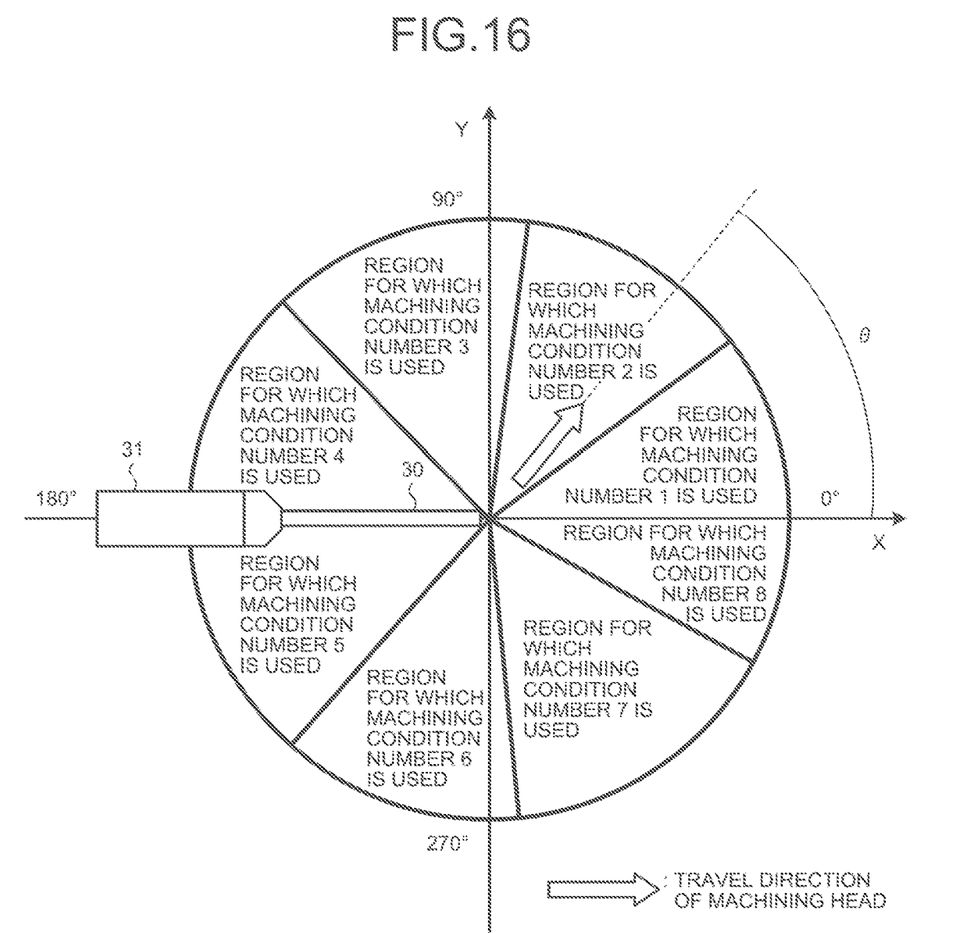
FIG. 16 is a diagram for describing how a machining condition is selected according to the first embodiment.

FIG. 16 is a diagram for describing how a machining condition is selected according to the first embodiment. FIG. 26 is a diagram illustrating an example that describes which machining condition number is selected in accordance with the travel direction θ of the machining head 3 within the XY plane when the maximum machining condition number MAX=8 in the machining condition table 25 in FIG. 15. If the machining head 3 travels as illustrated in FIG. 16, a machining condition number 2 is selected by the machining-condition selection unit 23.

As described above, the numerical control apparatus 2A may also adjust and select the beam profile of the laser beam in place of or in addition to the gas pressure of the gas ejected from the gas nozzle 33 in order to prevent off-centering of the bead shape. That is, a machining condition for the beam profile may be added as a machining condition for which a machining-condition set value is stored in the machining condition table 25. The beam profile of the laser beam is a machining condition that defines the intensity change within a beam irradiation region.

Figure 17:
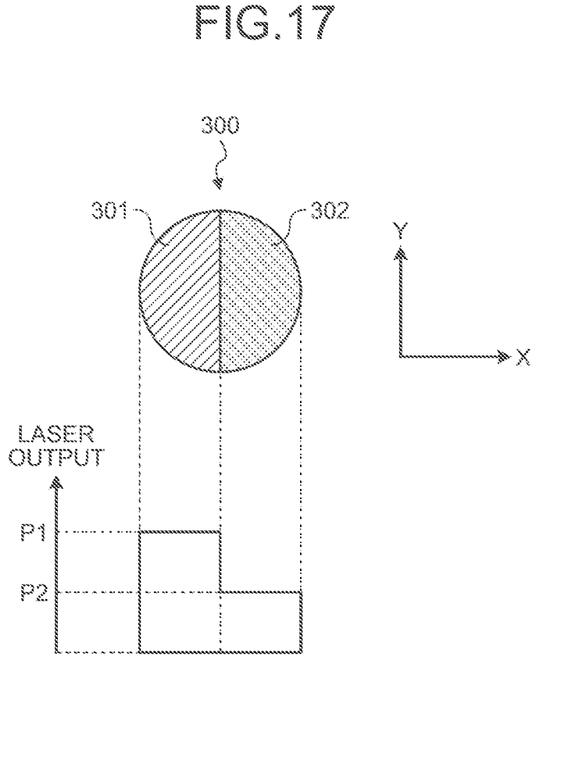
FIG. 17 is a diagram for describing the beam profile of a laser beam according to the first embodiment.

FIG. 17 is a diagram for describing the beam profile of the laser beam according to the first embodiment. FIG. 17 illustrates the laser-beam irradiation region 300 as viewed in the Z direction, which is the direction in which the laser beam is emitted, when the coordinate system is set as illustrated in FIG. 2. The irradiation region 300 of the base material 51 has a first region 301 and a second region 302. When the travel direction of the machining head 3 is in the Y direction, the percentage by which the laser beam emitted to the base material 51 is blocked is larger in the first region 301 in which the wire 30 is present as illustrated in FIG. 2 than that in the second region 302.

In such a case, the beam profile is adjusted such that, as illustrated in the lower portion of FIG. 17, a laser output value P1 of the laser beam emitted by the laser head 32 to the first region 301 is larger than a laser output value P2 of the laser beam emitted by the laser head 32 to the second region 302. The beam profile may be added to the machining condition table 25 as a machining condition and the laser output value P1 and the laser output value P2 may be set for the first region 301 and the second region 302, respectively. Alternatively, the laser output value P1 that is a reference output may be set as the laser output value (kw), and the ratio of the laser output value to the reference output may be set for the first region 301 and the second region 302 in the machining condition table 25 as the beam profile. In this case, as the ratio of the laser output value to the reference output, a numerical value 1 is set for the first region 301 and a numerical value (P2/P1) is set for the second region 302. The irradiation region 300 does not have to be divided into two as described above for setting the beam profile, as long as the heat distribution of the base material 51 within the irradiation region 300 can be adjusted. Thus, it is possible to define a function for determining the laser output value within a two-dimensional plane such that the laser output of the laser beam emitted to the irradiation region 300 changes continuously. Additionally, the heat distribution of the base material 51 within the irradiation region 300 may be adjusted by the combination of the gas pressure of the gas ejected from the gas nozzle 33 and the beam profile in order to prevent off-centering of the bead shape.

If a machining-condition set value for the beam profile is stored in the machining condition table 25, the numerical control apparatus 2A needs to be able to adjust the laser profile, but there is no limitation to the method for the adjustment. In this case, a machining-condition set value for the beam profile is given to the laser head 32 from the machining-condition output unit 24, and if the laser head 32 includes a deformable mirror that has changeable reflectance, a multi-laser that has a plurality of light sources, or the like, the laser profile can be adjusted.

As described above, the additive manufacturing system 101 according to the first embodiment, which includes the additive manufacturing apparatus 10A, can prevent off-centering of the head shape with simple control and also keep the bead width and bead height constant by adjusting a set value for a machining condition for additive machining on the basis of the angle formed by the direction in which the wire 30 is fed and the travel direction of the machining head 3 within a plane perpendicular to the direction in which the laser beam is emitted.

Conventional automatic welding robots employ a method of preventing off-centering of the bead shape and forming an ideal bead shape by rotating the machining head so that the angular difference between the feed direction of the wire and the travel direction of the machining head is constant all the time. In contrast, with the additive manufacturing system 101 according to the first embodiment, which includes the additive manufacturing apparatus 10A, it is not necessary to rotate the machining head. Thus, problems that arise when the machining head is rotated, such as twisting of the wire, vibrations of the end of the wire near the machining point, cutting of the wire, and interference between the wire and the device, can be avoided.

Second Embodiment

Figure 18:
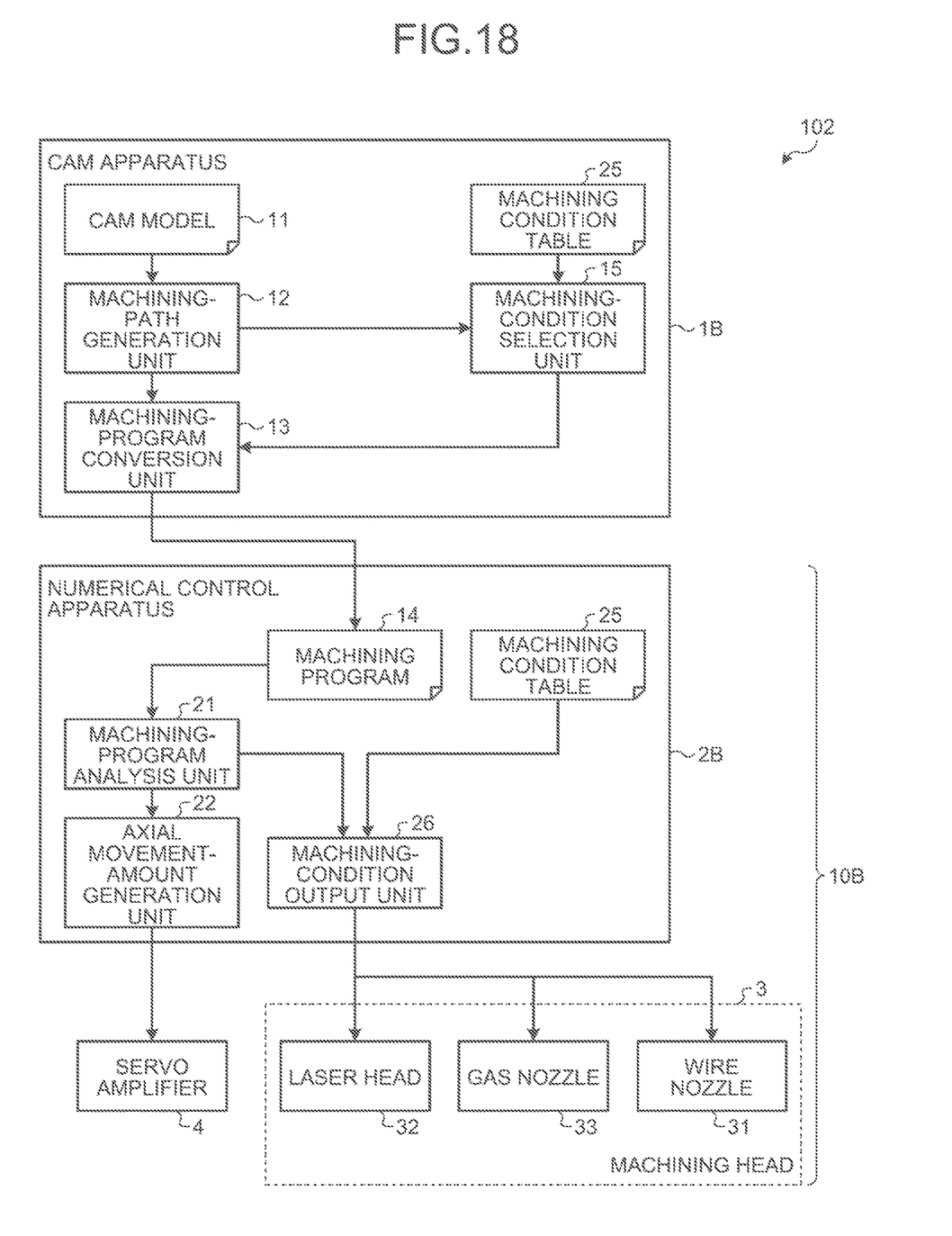

FIG. 18 is a block diagram illustrating a functional configuration of an additive manufacturing system 102 according to a second embodiment of the present invention. The additive manufacturing system 102 include a CAM apparatus 1B and an additive manufacturing apparatus 10B.

The additive manufacturing apparatus 10b includes a numerical control apparatus 2B, the machining head 3, the servo amplifier 4, and a motor (not illustrated) that is driven by the servo amplifier 4.

Differences in the additive manufacturing system 102 from the additive manufacturing system 101 according to the first embodiment are that the CAM apparatus 1B of the additive manufacturing system 102 includes a machining-condition selection unit 15 and the machining condition table 25 and that the numerical control apparatus 2B does not include a machining-condition selection unit. The CAD model 11, the machining condition table 25, the axial-movement-amount generation unit 22, the machining head 3, and the servo amplifier 4 are the same as these in the first embodiment. Differences in the additive manufacturing system 102 from the additive manufacturing system 101 will be described below.

The machining-path generation unit 12 analyzes the CAD model 11 and thereby generates a machining path, and sends the generated machining path to the machining-program conversion unit 13 and the machining-condition selection unit 15.

The machining-condition selection unit 15 obtains the movement-amount command value for each azial direction from the machining path received from the machining-path generation unit 12 and calculates the travel direction θ of the machining head 3. The machining-condition selection unit 15 also references the machining condition table 25 and selects a machining condition number from the machining condition table 25 using the obtained travel direction θ of the machining head 3, and sends the selected machining condition number to the machining-program conversion unit 13.

The machining-program conversion unit 13 converts the machining path sent from the machining-path generation unit 12 and the machining condition number sent from the machining-condition selection unit 15 to the machining program 14. In the machining program 14 generated by the machining-program conversion unit 13, the machining condition number is specified by an M code. That is, the machining program 14 indicates a trajectory of the machining head 3 to thereby specify the machining path, and the machining program 14 includes machining-condition-number information, which is information on the selected machining condition.

The machining-program analysis, unit 21 of the numerical control apparatus 2B analyzes the machining program 14 and thereby determines the end-point coordinates of each machining path specified by the machining program 14, and sends the end-point coordinates of each machining each to the axial-movement-amount generation unit 22. The machining-program analysis unit 21 also acquires a machining condition number in each machining path by reading the M code in the machining program 14 and sends the machining condition number to a machining-condition output unit 26.

The machining-condition output unit 26 references the machining condition table 25 of the numerical control apparatus 2B on the basis of the machining condition number sent from the machining-program analysis unit 21 and outputs corresponding machining-condition set values to the laser head 32 and the gas nozzle 33.

As described above, the additive manufacturing system 102 according to the second embodiment can cause the CAM apparatus 1B to select a machining condition for additive machining on the basis of the angle formed by the direction in which the wire 30 is fed and the travel direction of the machining head 3 within a plane perpendicular to the direction in which the laser beam is emitted.

Figure 19:
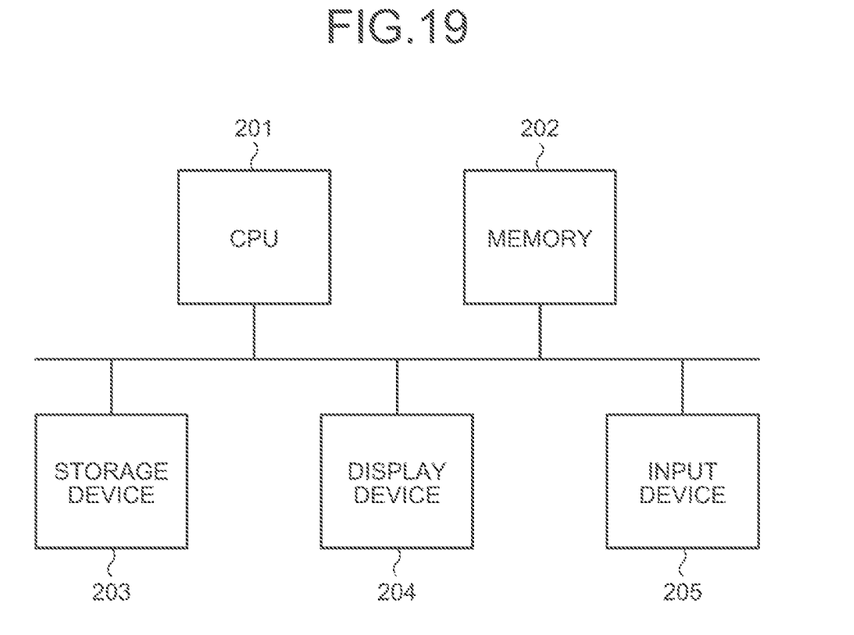
FIG. 19 is a block diagram illustrating a functional configuration of an additive manufacturing system according to a second embodiment of the present invention.

The numerical control apparatuses 2A and 2B according to the first and second embodiments are each implemented by a computer system, such as a personal computer or a general-purpose computer. FIG. 19 is a diagram illustrating a hardware configuration in a case in which the function of each of the numerical control apparatuses 2A and 2B according to the first and second embodiments is implemented by a computer system. When the function of each of the numerical control apparatuses 2A and 2B is implemented by a computer system, the function of each of the numerical control apparatuses 2A and 2B is implemented by a central processing unit (CPU) 201, a memory 202, a storage device 203, a display device 204, and an input device 205 as illustrated in FIG. 19. The function of an additive manufacturing method that each of the numerical control apparatuses 2A and 2B performs is implemented by software, firmware, or a combination of software and firmware. The software or firmware is described in the form of a program and stored in the storage device 203. The CPU 201 implements the functions of the machining-program analysis unit 21, the axial-movement-amount generation unit 22, the machining-condition selection unit 23, and the machining-condition output units 24 and 26 by loading the software or firmware, which is stored in the storage device 203, into the memory 202 and executing it. That is, the computer system includes the storage device 203 for storing programs that, upon execution, by the CPU 201, of the functions of the machining-program analysis unit 21, the axial-movement-amount generation unit 22, the machining-condition selection unit 23, and the machining-condition output units 24 and 26, cause steps for performing the additive manufacturing method according to the first and second embodiments to be executed. It can also be said that these programs cause a computer to execute processing that is implemented by the functions of the machining-program analysis unit 21, the axial-movement-amount generation unit 22, the machining-condition selection unit 23, and the machining-condition output units 24 and 26. The memory 202 can be a volatile storage area, such as a random access memory (RAM). The storage device 203, which stores the machining program 14 and the machining condition table 25, can be a nonvolatile or volatile semiconductor memory, such as a read only memory (ROM) and a flash memory, or a magnetic disk, specific examples of the display device 204 are a monitor and a display. Specific examples of the input device 205 are a keyboard, a mouse, and a touch panel.

The configurations in the embodiments described above represent some examples of an aspect of the present invention, and they can be combined with another publicly known technique and partially omitted or modified without departing from the spirit of the present invention.

REFERENCE SIGNS LIST 1A, 1B CAM apparatus; 2A, 2B numerical control apparatus; 3 machining head; 4 servo amplifier; 10A, 10B additive manufacturing apparatus; 11 CAD model; 12 machining-path generation unit; 13 machining-program conversion unit; 14 machining program; 15 machining-condition selection unit; 21 machining-program analysis unit; 22 axial-movement-amount generation unit; 23 machining-condition selection unit; 24, 26 machining-condition output unit; 25 machining condition table; 30 wire; 31 wire nozzle; 32 laser head; 33 gas nozzle; 50 bead; 51 base material; 101, 102 additive manufacturing system; 201

CPU; 202 memory; 203 storage device; 204 display device; 205 input device; 300 irradiation region; 301 first region; 302 second region.

The invention claimed is:

1. An additive manufacturing apparatus that performs additive machining by controlling a machining head that includes a wire nozzle to feed a wire material to a machining region on a surface of a base material, a beam source capable of emitting a beam to an end of the wire material, and a gas nozzle placed such that the beam source is interposed between the gas nozzle and the wire nozzle, the gas nozzle directing a gas toward the machining region, the apparatus comprising:
   machining-condition selection circuitry to obtain an angle that is formed between a direction in which the wire material is fed and a travel direction of the machining head, when viewed in a direction in which the beam is emitted, and to select one of a plurality of machining conditions for the additive machining in accordance with the angle,
   wherein the plurality of machining conditions are determined at least in accordance with a sum of an area of a portion of the wire material and an area of a portion of a bead formed by the additive machining, the portion of the wire material and the portion of the bead being within a irradiation region of the beam as viewed in a direction in which the beam is emitted.

2. The additive manufacturing apparatus according to claim 1, further comprising a machining condition table that stores the plurality of machining conditions, each of which is dependent on the angle, wherein:
   the machining-condition selection circuitry obtains the angle on a basis of a machining program that specifies a machining path and selects the one of the plurality of machining conditions using the angle and the machining condition table.

3. The additive manufacturing apparatus according to claim 2, wherein the machining condition table stores an output value of the beam and a gas pressure of the gas as the machining condition that is dependent on the angle.

4. The additive manufacturing apparatus according to claim 3, wherein the machining condition table stores a beam profile that specifies intensity change within the irradiation region of the beam as the machining condition that is dependent on the angle.

5. The additive manufacturing apparatus according to claim 1, wherein the plurality of machining conditions is determined in accordance with a percentage of the amount of beam irradiation of the base material.

6. An additive manufacturing system that performs additive machining by controlling a machining head that includes a wire nozzle to feed a wire material to a machining region on a surface of a base material, a beam source capable of emitting a beam to an end of the wire material, and a gas nozzle placed such that the beam source is interposed between the gas nozzle and the wire nozzle, the gas nozzle directing a gas toward the machining region, the additive manufacturing system comprising:
   a machining condition table that stores a plurality of machining conditions, each of which is used for the additive machining and is dependent on an angle that is formed between a direction in which the wire material is fed and a travel direction of the machining head, when viewed in a direction in which the beam is emitted;
   machining-condition selection circuitry to obtain the angle on a basis of a machining path and to select one of the plurality of machining conditions using the angle and the machining condition table; and
   a numerical control apparatus to select the one of the plurality of machining conditions on a basis of a machining program containing information on the one of the plurality of machining conditions selected by the machining-condition selection circuitry and in accordance with the angle,
   wherein the plurality machining conditions are determined at least in accordance with a sum of an area of a portion of the wire material and an area of a portion of a bead formed by the additive machining, the portion of the wire material and the portion of the bead being within a irradiation region of the beam as viewed in a direction in which the beam is emitted.

7. The additive manufacturing system according to claim 6, wherein the machining condition table stores an output value of the beam and a gas pressure of the gas as the machining condition that is dependent on the angle.

8. The additive manufacturing system according to claim 7, wherein the machining condition table stores a beam profile that specifies intensity change within the irradiation region of the beam as the machining condition that is dependent on the angle.

9. The additive manufacturing system according to claim 6, wherein the plurality of machining conditions is determined in accordance with a percentage of the amount of beam irradiation of the base material.

10. An additive manufacturing method for performing additive machining by controlling a machining head that includes a wire nozzle to feed a wire material to a machining region on a surface of a base material, a beam source capable of emitting a beam to an end of the wire material, and a gas nozzle placed such that the beam source is interposed between the gas nozzle and the wire nozzle, the gas nozzle directing a gas toward the machining region, the method comprising:
   obtaining an angle that is formed between a direction in which the wire material is fed and a travel direction of the machining head, when viewed in a direction in which the beam is emitted; and
   selecting one of a plurality of machining conditions for the additive machining in accordance with the angle,
   wherein the plurality of machining conditions are determined at least in accordance with a sum of an area of a portion of the wire material and an area of a portion of a bead formed by the additive machining, the portion of the wire material and the portion of the bead being within a irradiation region of the beam as viewed in a direction in which the beam is emitted.

11. The additive manufacturing method according to claim 10, wherein the plurality of machining conditions is determined in accordance with a percentage of the amount of beam irradiation of the base material.

* * * * *